US005822290A

United States Patent [19]

Lee

[11] Patent Number: 5,822,290

[45] Date of Patent: Oct. 13, 1998

[54] DISK PLAYER HAVING ASCENDING/ DESCENDING STRUCTURE FOR A DECK

[75] Inventor: Sang-jun Lee, Suwon, Rep. of Korea

[73] Assignee: Samsung Electronics Co., Ltd., Kyungki-Do, Rep. of Korea

[21] Appl. No.: 757,816

[22] Filed: Nov. 27, 1996

[30] Foreign Application Priority Data

Feb. 27, 1996 [KR] Rep. of Korea .................... 1996-4907

[51] Int. Cl.[6] .................................................... G11B 33/02

[52] U.S. Cl. ......................................... 369/75.2; 369/77.1

[58] Field of Search ................................. 369/75.1, 75.2, 369/77.1; 360/99.02, 99.03, 99.06, 99.07

[56] References Cited

U.S. PATENT DOCUMENTS

| | | | |
|---|---|---|---|
| 4,755,978 | 7/1988 | Takizawa et al. | 369/75.2 X |
| 4,759,008 | 7/1988 | Hirano et al. | 369/75.2 |
| 5,187,701 | 2/1993 | Verheyen | 369/75.2 |
| 5,218,592 | 6/1993 | Isshiki et al. | 369/75.2 |
| 5,504,729 | 4/1996 | Ikedo et al. | 369/75.1 |
| 5,586,104 | 12/1996 | Choi | 369/75.2 X |

*Primary Examiner*—Stuart S. Levy
*Assistant Examiner*—William J. Klimowicz
*Attorney, Agent, or Firm*—Sughrue, Mion, Zinn, Macpeak & Seas, PLLC

[57] ABSTRACT

A disk player which reproduces information recorded on a disk, includes a housing in the front of which an aperture is formed. A disk tray is installed to move into and out of the housing through the aperture and has an upper surface on which a disk is placed. A deck is installed under the disk tray in the housing. A turntable for rotating the disk and an optical pickup for reading information of the disk are installed on the deck. A mechanism is provided for lifting the deck while keeping the deck level. Thus, the disk can be positively clamped since a deck on which a turntable is installed ascends while keeping level.

3 Claims, 5 Drawing Sheets

134
122a
146(148)
122
133
130
116(118)
120
131
145(147)
134
110
121
B
D
115(117)

DISK PLAYER HAVING ASCENDING/ DESCENDING STRUCTURE FOR A DECK

BACKGROUND OF THE INVENTION

The present invention relates to a disk player for reproducing information recorded on a disk and, more particularly, to a disk player in which an ascending/ descending structure of a deck, where a turntable and an optical pickup are combined, is improved.

Generally, a disk player includes a housing, a disk tray for carrying the disk into and out from the housing and a reproducing element for reproducing the information of the disk seated on the disk tray.

FIG. 1 is a schematic plan view showing a conventional disk player, in which a disk tray is ejected through an aperture of a housing. FIG. 2 is a view of a cam of FIG. 1 seen from direction A. FIG. 3 is a schematic sectional view showing a state in which the deck ascends after the disk tray is inserted into the housing.

Referring to the above drawings, an aperture 21 is formed in the front of a housing 20 of a conventional disk player and a disk tray 10 is installed so as to be inserted into and ejected from the housing 20 through the aperture 21. A deck 30 to which a turntable 31 for rotating the disk and an optical pickup 32 for reading the information recorded on the disk are combined is installed under a moving path of the disk tray 10 in the housing 20.

A disk placement portion 11 on which the disk is placed is formed on the upper surface of the disk tray 10. A rack 12 extending along the moving direction of the disk tray 10 is formed on the lower surface of the disk tray 10. The rack 12, which has a curved portion 12*a* with a predetermined curvature formed at the outer end thereof, is engaged with a loading gear 45. The loading gear 45 is rotatably coupled with a shaft 65 which is fixed to a supporting member 60 and the supporting member 60 is rotatably coupled with a fixed shaft 44*a* which is fixed to the housing 20. A gear portion 62 is formed on one side of the supporting member 60 and is engaged with a rack portion 71 of a cam member 70 which is slidably installed in the housing 20. A slanted cam slot 72 which is inclined to the bottom of the housing 20 is formed in the cam 71.

A hinge shaft 30*b* is formed on both sides of the rear end of the deck 30 and is combined with a guide portion 20*b* formed in the housing 20. A combination protrusion 30*a* which protrudes forward is formed in the front end portion at which the turntable 31 is installed and is inserted in the slanted cam slot 72 of the cam member 70.

In the conventional disk player having such a structure, the drive force of a loading motor 40 is transmitted to the loading gear 45 through pulleys 41 and 43, a belt 42 and gears 43*a* and 44 to rotate the loading gear 45. The disk tray 10 moves into and out of the housing 20 through the aperture 21 according to the rotation direction of the loading gear 45 since the rack 12 on the lower surface of the disk tray 10 is engaged with the loading gear 45.

If the loading gear 45 keeps on rotating after the disk tray 10 is inserted into the housing 20, the disk tray 10 cannot proceed further and the loading gear 45 revolves along the curved portion 12*a* around the shaft 44*a*. As the loading gear 45 revolves around the shaft 44*a*, the supporting member 60 on which the loading gear 45 is installed rotates counter-clockwise around the shaft 44*a*. At this time, the cam member 70, which is engaged with the supporting member 60, moves from a position indicated by a solid line to a position indicated by a dotted line as shown in FIG. 2 and the protrusion 30*a* of the deck inserted into the slanted cam slot 72 of the cam member 70 ascends along the slanted cam slot 72. Therefore, the deck 30 ascends to the position indicated by the solid line from the position indicated by the dotted line in FIG. 3 around the hinge shaft 30*b* at the rear end thereof. The turntable 31 installed on the deck 30 lifts a disk D seated on the disk displacement portion 11 of the disk tray 10 and clamps the disk D with a chuck (not shown) for pressing the upper surface of the disk.

As described above, the turntable ascends and descends as the deck pivots around the hinge shaft at the rear end thereof in the conventional disk player. Therefore, since it is difficult to keep the turntable even after ascending of the deck is completed, it is difficult to clamp the disk while keeping the turntable and the chuck parallel, thus causing a problem in that the disk is not completely clamped.

SUMMARY OF THE INVENTION

It is an object of the present invention to provide a disk player in which an ascending/descending structure of a deck is improved so that a disk located on a disk tray is positively clamped.

To achieve the object, there is provided a disk player according to the present invention, comprising a housing having a front portion in which an aperture is formed, a disk tray which is movably supported in said housing to move into and out of the housing through the aperture and having an upper surface on which a disk is placed, a deck which is disposed under the disk tray in the housing and on which a turntable for rotating the disk and an optical pickup for reading information of the disk are installed, and means for lifting the deck while keeping the deck level.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

A preferred embodiment according to the present invention is described in detail with reference to the accompanying drawings.

Figure 1:
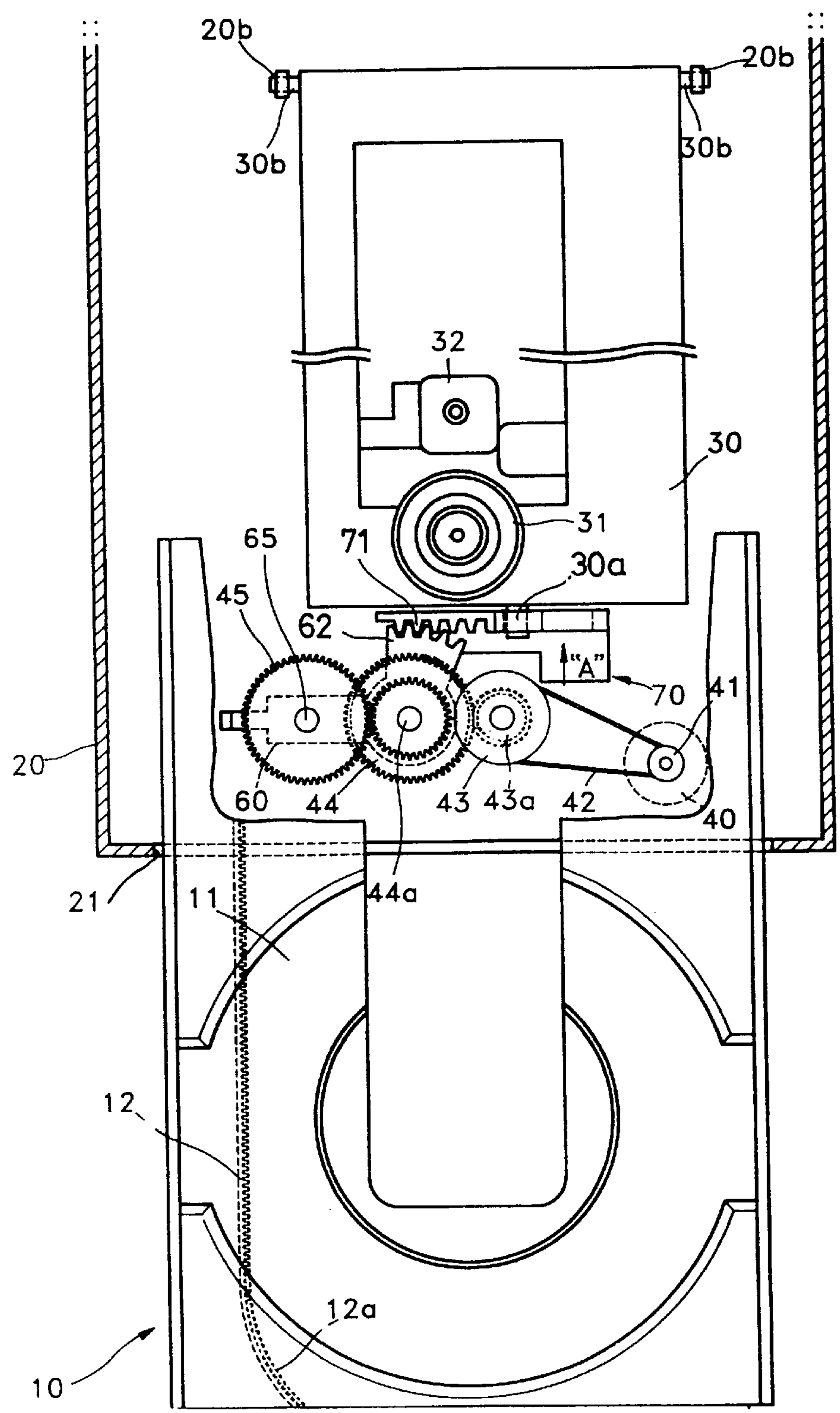
FIG. 1 is a schematic plan view showing a conventional disk player.
Figure 2:
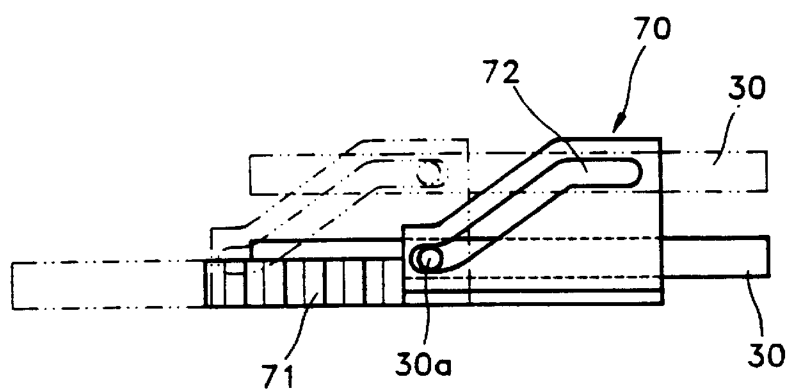
FIG. 2 is a view of a cam and a deck of FIG. 1 seen from direction A.
Figure 3:
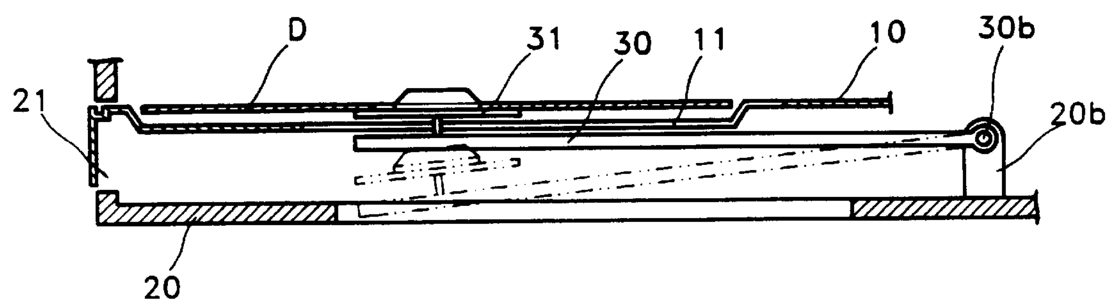
FIG. 3 is a schematic sectional view showing a state in which a disk tray is inserted into a housing in the disk player shown in FIG. 1.
Figure 4:
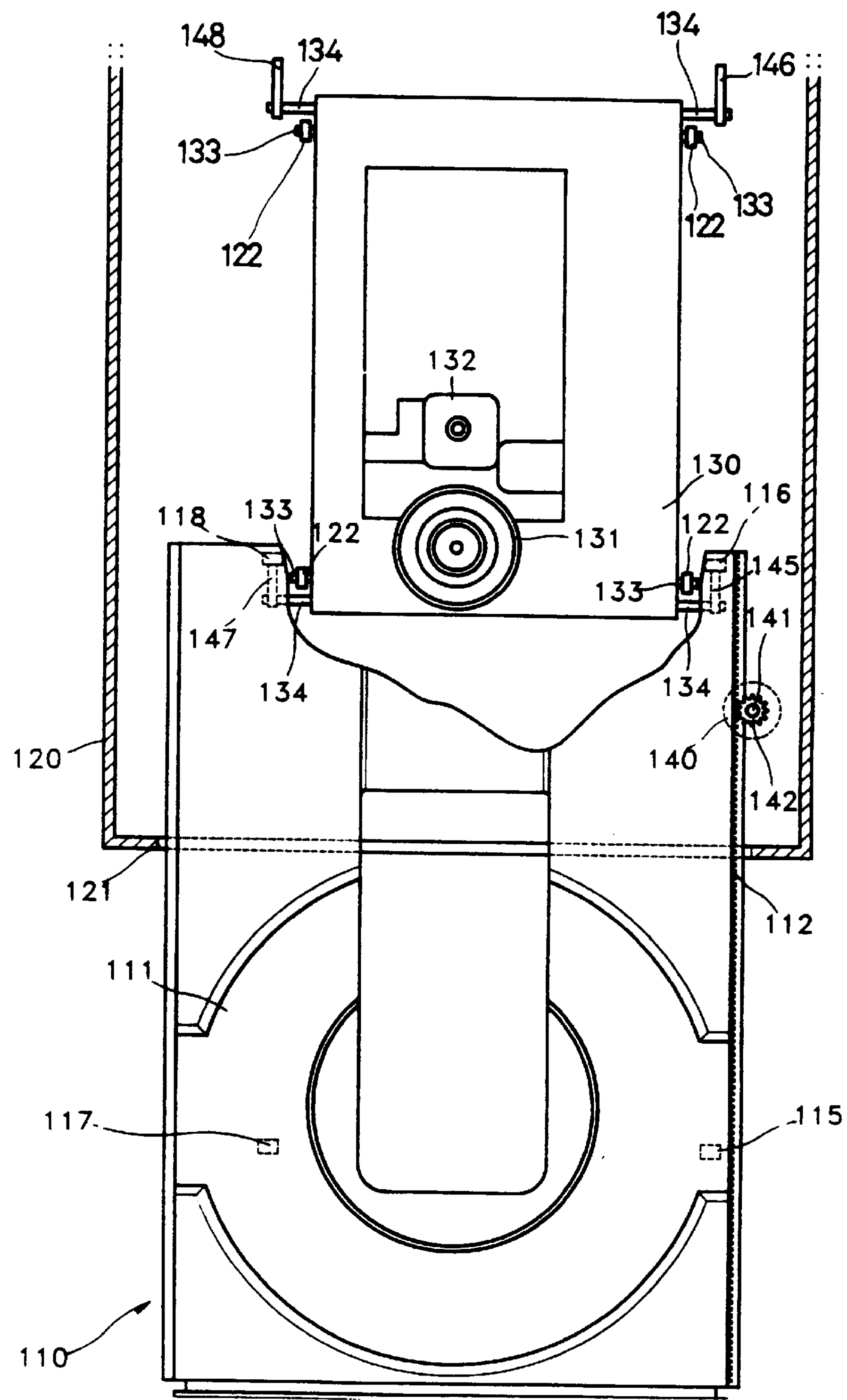
FIG. 4 is a schematic plan view showing a disk player according to the present invention.
Figure 5:
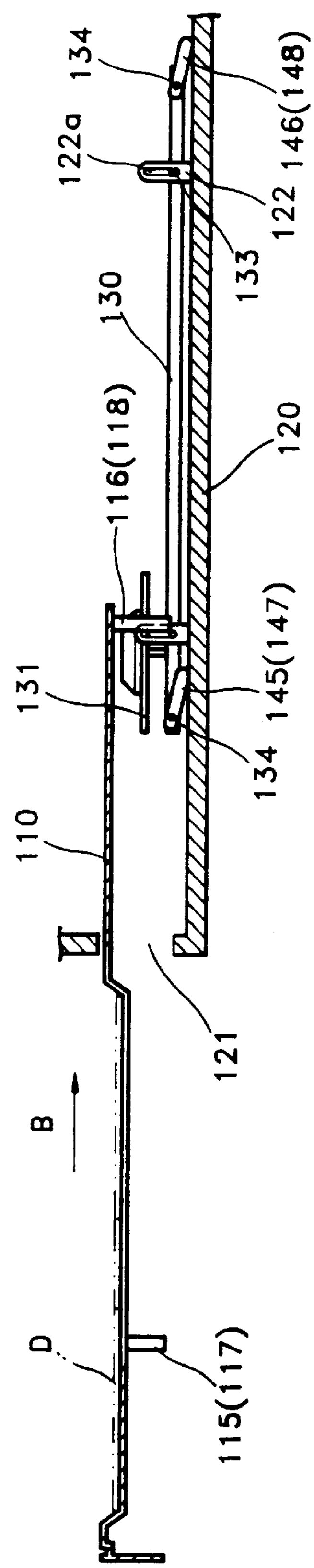
FIG. 5 is a schematic sectional view of the disk player shown in FIG. 4.

Referring to FIGS. 4 and 5, an aperture 121 is formed in the front of a housing 120 of a disk player 100 of the present embodiment and a disk tray 110 is installed so as to move into and out of the housing 120 through the aperture 121. Inside the housing 120, a deck 130 is installed under the moving path of the disk tray 110. A turntable 131 for rotating the disk and an optical pickup 132 for reading information recorded on the disk are disposed on the deck 130.

A disk placement portion 111 on which the disk is placed is formed on the upper surface of the disk tray 110. A plurality of pressing portions 115, 116, 117, and 118 protrude from the lower surface of the disk tray 110. A rack 112 extending along the moving direction of the disk tray 110 is formed on one side of the disk tray 110. A pinion gear 142 is combined to an output shaft 141 of a loading motor 140 installed in the housing 120 and is engaged with the rack 112.

Guide protrusions 133 which are slidably inserted into guide slots 122*a* of guide portions 122 are formed at each corner portion of the deck 130. The guide portions 122 are installed in the housing 120 and the guide slots 122*a* are formed in the guide portions 122 vertically. Therefore, the deck 130 can ascend and descend as the guide protrusions 133 are guided along the guide slots 122*a*.

Hinge shafts 134, which are combined with levers 145, 146, 147, and 148, are formed at each corner of the deck 130, adjacent to the guide protrusions 133. The respective levers 145, 146, 147, and 148 can rotate from a lying position (refer to FIG. 5) to a standing position (refer to FIG. 6). In the standing position, the upper ends of the levers 145, 146, 147, and 148 are respectively located on the moving paths of the respective pressing portions 115, 116, 117, and 118 as the disk tray 110 is inserted into the housing 120. The lower end of each lever 145, 146, 147, and 148 slidably contacts the bottom of the housing 120.

Figure 6:
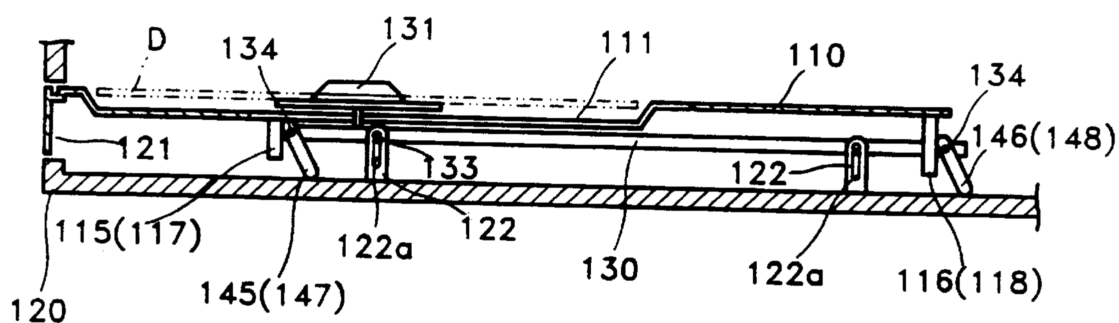
FIG. 6 is a schematic sectional view showing a state in which the deck ascends from a position shown in FIG. 5.

In the disk player of such a configuration, when the loading motor 140 operates, the pinion gear 142, which is combined with the output shaft 141 of the loading motor 140, rotates. At this time, the disk tray 110 is inserted into the housing 120 through the aperture 121 in the direction "B" (see FIG. 5), since the rack 112 formed at the side of the disk tray 110 is engaged with the pinion gear 142. When the insertion of the disk tray 110 into the housing 120 is nearly completed, the pressing portions 115, 116, 117, and 118 formed on the lower surface of the disk tray 110 press one end of each lever corresponding thereto, thus rotating the respective levers 145, 146, 147, and 148 to the standing position. According to the rotation of the levers 145, 146, 147, and 148, the lower end portions of the levers 145, 146, 147, and 148 push the deck upward as shown in FIG. 6 while sliding on the bottom surface of the housing 120. At this time, the deck 130 ascends while keeping level as the guide protrusions 133 ascend along the guide slots 122*a*. Therefore, the turntable 131 disposed on the deck 130 ascends while keeping level. The ascending turntable 131 lifts the disk which is placed on the disk placement portion 111 of the disk tray 110 and, as in the conventional disk player, clamps the disk with a chuck (not shown) above the disk.

In the disk player according to the present invention, it is possible to positively clamp the disk since the turntable 131 ascends while keeping level and lifts the disk D on the disk tray 110, unlike the conventional disk player.

In the disk player according to the present invention, it is unnecessary to provide the supporting member 60 and the cam member 70 for the rotation of the deck 30 as in the conventional disk player. Since the pinion gear 142 combined with the output shaft 141 is directly engaged with the rack 112 as shown in FIG. 4, the structure for moving the disk tray 110 is simplified.

In the present embodiment, the deck 130 vertically ascends by the combination of the guide protrusions 133 formed in the deck 130 and the guide slots 122*a* formed in the guide portion 122 of the housing. However, the deck may also ascend vertically, for example, by installing a plurality of guide rods in the housing and slidably combining the deck to the guide rods. An appropriate configuration other than the above-described structures can be employed for the vertical movement of the deck within the scope of the present invention.

In the disk player according to the present invention, the disk can be positively clamped since the deck on which the turntable is installed ascends while keeping level.

It is contemplated that numerous modifications may be made to the disk player of the present invention without departing from the spirit and scope of the invention as defined in the following claims.

What is claimed is:

1. A disk player, comprising:

a housing having a front portion in which an aperture is formed;

a disk tray which is movably supported in said housing to move into and out of said housing through said aperture and having an upper surface on which a disk is placed;

a deck which is disposed under said disk tray in said housing and on which a turntable for rotating the disk and an optical pickup for reading information of the disk are installed; and a lifting mechanism which lifts said deck while keeping said deck level, wherein said lifting mechanism comprises:

a plurality of pressing portions which protrude from a lower surface of said disk tray; and a plurality of lever members rotatably mounted to said deck and operative to move from a lying position to a standing position, wherein said pressing portions rotate the respective lever members to the standing position when said disk tray is inserted into said housing, thereby lifting said deck.

2. The disk player as claimed in claim 1, further comprising:

a rack which is formed on one side of said disk tray along a movement direction of said disk tray;

a motor installed in said housing and having an output shaft;

a pinion which is coupled with the output shaft of said motor and is engaged with said rack of said disk tray, wherein said disk tray is moved by engagement of said pinion and said rack during operation of said motor.

3. A disk player for reproducing information recorded on a disk, comprising:

a housing having a bottom portion and a front portion in which an aperture is formed;

a disk tray which is movably supported in said housing to move into and out of said housing through said aperture, said disk tray having an upper surface for receiving the disk and a lower surface having a plurality of pressing portions protruding therefrom;

a plurality of guide portions having respective guide slots and being fixed to the bottom portion of said housing;

a deck which is disposed under said disk tray in said housing and on which a turntable for rotating the disk and an optical pickup for reading information of the disk are installed, said deck having a plurality of guide protrusions which are respectively slidably inserted into said guide slots of said guide portions; and a plurality of lever members having upper ends which are rotatably mounted to said deck and lower ends which slidably contact the bottom portion of the housing and being operative to move from a lying position to a standing position, wherein said pressing portions respectively rotate the lever members to the standing position and said guide protrusions are guided along said guide slots when said disk tray is inserted into said housing, thereby lifting said deck while keeping said deck level.

* * * * *